United States Patent
Chen et al.

(10) Patent No.: US 12,037,094 B2
(45) Date of Patent: Jul. 16, 2024

(54) FOLDING WAVE-ENERGY-HARVESTING MECHANISM FOR GENERATING ELECTRICITY TO POWER AN UNDERWATER VEHICLE

(71) Applicant: Shanghai Jiao Tong University, Shanghai (CN)

(72) Inventors: Weixing Chen, Shanghai (CN); Yunfei Lu, Shanghai (CN); Shaoxun Li, Shanghai (CN); Weidong Zhang, Shanghai (CN); Feng Gao, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 181 days.

(21) Appl. No.: 17/881,608

(22) Filed: Aug. 5, 2022

(65) Prior Publication Data
US 2023/0060419 A1 Mar. 2, 2023

(30) Foreign Application Priority Data
Aug. 31, 2021 (CN) .......................... 202111013996.6

(51) Int. Cl.
| F03B 13/14 | (2006.01) |
| B63B 1/30 | (2006.01) |
| B63G 8/00 | (2006.01) |

(52) U.S. Cl.
CPC ................ *B63G 8/001* (2013.01); *B63B 1/30* (2013.01); *F03B 13/14* (2013.01)

(58) Field of Classification Search
None
See application file for complete search history.

(56) References Cited

U.S. PATENT DOCUMENTS

| 6,276,294 B1 | 8/2001 | Geriene et al. |
| 2011/0226174 A1* | 9/2011 | Parks ..................... B64U 10/70 |
| | | 114/313 |
| 2023/0060419 A1* | 3/2023 | Chen ..................... B63G 8/001 |

FOREIGN PATENT DOCUMENTS

| CN | 107235130 A | 10/2017 |
| CN | 111703562 A | 9/2020 |
| CN | 113148074 A * | 7/2021 |

OTHER PUBLICATIONS

English machine translation of CN 111703562 A. (Year: 2020).*

* cited by examiner

*Primary Examiner* — Tulsidas C Patel
*Assistant Examiner* — S. Mikailoff
(74) *Attorney, Agent, or Firm* — Bayramoglu Law Offices LLC

(57) ABSTRACT

A folding wave-energy-harvesting mechanism for an underwater vehicle includes an underwater-vehicle main body and a wave-energy-harvesting-device main body. The wave-energy-harvesting-device main body includes a hydrofoil assembly and a yaw assembly. The first state of the hydrofoil assembly is a folding state, and the second state is an unfolding state. The first state of the yaw assembly is the folding state, and the second state is the unfolding state. The wave-energy-harvesting-device main body further includes a driving assembly and an energy-storage assembly. The driving assembly is configured to switch the hydrofoil assembly and the yaw assembly in the first state and the second state to each other. The energy-storage assembly is configured to store the wave energy harvested by the hydrofoil assembly. When the hydrofoil assembly and the yaw assembly unfold, the hydrofoil assembly increases the efficient area for wave-energy harvesting.

10 Claims, 4 Drawing Sheets

FOLDING WAVE-ENERGY-HARVESTING MECHANISM FOR GENERATING ELECTRICITY TO POWER AN UNDERWATER VEHICLE

CROSS REFERENCE TO THE RELATED APPLICATIONS

This application is based upon and claims priority to Chinese Patent Application No. 202111013996.6, filed on Aug. 31, 2021, the entire contents of which are incorporated herein by reference.

TECHNICAL FIELD

The present invention relates to the field of underwater vehicles and new energy sources, specifically, a folding wave-energy-harvesting mechanism for an underwater vehicle.

BACKGROUND

Underwater vehicles are important carriers for marine environmental monitoring, marine scientific research, and marine military missions. Existing underwater vehicles are mainly powered by external cables or by their own batteries, which have defects such as insufficient kinetic dexterity, a small range of motion, weak endurance, and difficulty in carrying out lasting and large-scale underwater operations. Wave energy is the highest-grade ocean energy featuring high energy density, large storage capacity and wide distribution, and is regarded as an ideal energy harvesting object. Therefore, the development of built-in energy generation technology based on wave energy is an important way to achieve a continuous energy supply for underwater vehicles.

The Chinese patent No. CN107235130A discloses a hydrofoil-swinging wave energy harvesting device for a small marine vehicle, including swinging hydrofoils, a drive compartment, an internal rotating drive mechanism, a compartment connecting baffle partition, and a generator. The internal rotating drive mechanism includes an input shaft, a gear acceleration mechanism, and an output shaft. The swinging hydrofoils are connected to the input shaft through a U-shaped connection member. The output shaft is connected to the generator. The compartment connecting the baffle partition realizes a sealed connection between compartments and is provided with a bearing hole for supporting the input shaft or the output shaft. A spring is further connected between the swinging hydrofoil and the housing of the drive compartment.

The inventor believes that the wave energy harvesting device in the prior art is limited by the size of the underwater vehicle itself, and the wingspan of the hydrofoil and the effective action area between the hydrofoil and the waves are very small, leading to a low power generation of the whole device. Further, the existence of the swing-wing further significantly increases the resistance to the motion of the underwater vehicle and interferes with the motion thereof. Furthermore, the existing device is unable to passively adjust the postures thereof to counter waves according to the wave conditions on the sea surface, and the wave energy harvesting capability is weak, so the existing device needs to be improved.

SUMMARY

Given the defects in the prior art, an objective of the present invention is to provide a folding wave-energy-harvesting mechanism for an underwater vehicle.

According to the present invention, the folding wave-energy-harvesting mechanism for an underwater vehicle includes an underwater-vehicle main body and a wave-energy-harvesting-device main body. The wave-energy-harvesting-device main body is arranged on the underwater-vehicle main body. The wave-energy-harvesting-device main body includes a hydrofoil assembly and a yaw assembly. The hydrofoil assembly and the yaw assembly both include a first state and a second state. The first state of the hydrofoil assembly is a folding state, and the second state of the hydrofoil assembly is an unfolding state. The first state of the yaw assembly is the folding state, and the second state of the yaw assembly is the unfolding state. The wave-energy-harvesting-device main body further includes a driving assembly and an energy-storage assembly. The driving assembly is configured to switch the first state and the second state of the hydrofoil assembly, and the driving assembly is configured to switch the first state and the second state of the yaw assembly. The energy-storage assembly is configured to store the wave energy harvested by the hydrofoil assembly.

Preferably, the hydrofoil assembly includes a hydrofoil membrane and a plurality of connecting rods. The plurality of the connecting rods is hinged with each other to form at least one parallelogram-shaped folding structure. The first state of the hydrofoil assembly is that the folding structure folds away, and the second state of the hydrofoil assembly is that the folding structure unfolds. The hydrofoil membrane wraps on the folding structure, and the hydrofoil membrane is a thin membrane made of a soft material. When the hydrofoil assembly is in the first state, the hydrofoil membrane is in a pressed state. When the hydrofoil assembly is in the second state, the hydrofoil membrane is in an unfolded state.

Preferably, the yaw assembly includes a first rod member, a second rod member, and a yaw membrane. One end of the first rod member is hinged to the center of the second rod member. The first rod member and the second rod member are hinged to the driving assembly. The yaw membrane is arranged between the second rod member and the hydrofoil assembly, and the yaw membrane is a soft membrane. When the yaw assembly is in the first state, the yaw membrane is in a pressed state. When the yaw assembly is in the second state, the yaw membrane is in an unfolded state.

Preferably, when both the hydrofoil assembly and the yaw assembly are in the second state, the yaw membrane and the hydrofoil membrane are perpendicular to each other.

Preferably, ends, adjacent to the driving assembly, of the first rod member and the second rod member are both connected to the hydrofoil assembly by a positioning pin.

Preferably, the energy-storage assembly includes a transmission shaft, a change-speed gearbox, and a generator. The transmission shaft is drivingly connected to one end of the change-speed gearbox, and the other end of the change-speed gearbox is drivingly connected to the generator. The transmission shaft is fixedly provided with a rotating hinge. A sliding hinge is rotatably and slidably arranged on the transmission shaft. The first rod member and the connecting rod that is connected to the first rod member are both hinged to the rotating hinge. The second rod member and the connecting rod that is connected to the second rod member are both hinged to the sliding hinge.

Preferably, the driving assembly includes a screw rod, a stepping motor, a nut, and a baffle. The baffle fixedly is connected to the sliding hinge. The baffle is fixedly connected to the nut. The screw rod is screwed to and passes through the nut, and the stepping motor drives the screw rod to rotate.

Preferably, the wave-energy-harvesting-device main body includes: a first partitioning board, a second partitioning board, a third partitioning board, a fourth partitioning board, a bottom board, a fifth partitioning board, a counter-flow board, and a top cover board. The first partitioning board, the second partitioning board, the third partitioning board, the fourth partitioning board, the bottom board, and the top cover board are coordinated to form a rear cabin, and the rear cabin is configured for accommodating the energy-storage assembly.

Preferably, the bottom board, the fifth partitioning board, the counter-flow board and the top cover board are coordinated to form a front cabin, and the front cabin is configured for accommodating the driving assembly.

Preferably, a side, facing away from the counter-flow board, of the fifth partitioning board is provided with a position-limiting block.

Compared to the prior art, the present invention has the following advantages.

1. In the present invention, the foldable hydrofoil assembly being unfolded can increase the surface area thereof to improve the electricity-generating efficiency of the wave-energy-harvesting mechanism when generating electricity under the waves. When folding away, the hydrofoil assembly reduces the resistance to the motion of the underwater vehicle, thereby improving the kinematic dexterity and the endurance of the underwater vehicle.

2. In the present invention, the foldable yaw assembly being unfolding enables the underwater vehicle to passively adjust the posture of countering waves according to the wave conditions, improving the efficiency of wave energy harvesting.

3. In the present invention, the position-limiting block guides the hydrofoil assembly and the yaw assembly, and provides limiting protection for the hydrofoil assembly and the yaw assembly, thereby eliminating reducing the adverse impact caused by sways of the hydrofoil assembly and the yaw assembly in a folding process on the motion of the underwater vehicle.

BRIEF DESCRIPTION OF THE DRAWINGS

Other features, objectives and advantages of the present invention will become more apparent by reading the detailed description of non-limiting embodiments made with reference to the following drawings.

Figure 1:
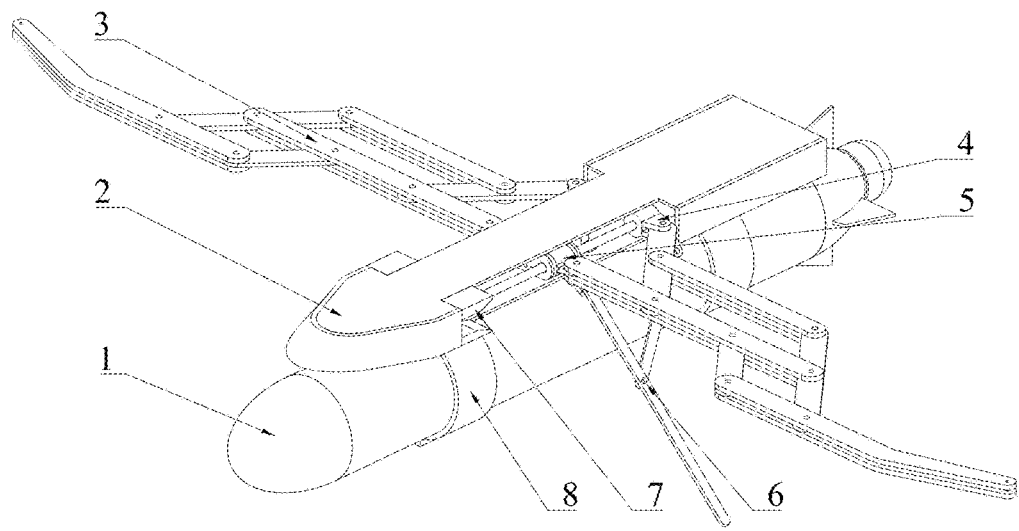
FIG. 1 is a top schematic view of a wave-energy-harvesting mechanism as a whole without a hydrofoil membrane in the present invention.

Reference numerals in the drawings:
underwater-vehicle main body 1, wave-energy-harvesting-device main body 2, first partitioning board 21, second partitioning board 22, third partitioning board 23, fourth partitioning board 24, bottom board 25, fifth partitioning board 26, counter-flow board 27, top cover board 28, hydrofoil assembly 3, hydrofoil membrane 31, connecting rod 32, rotating hinge 4, sliding hinge 5, screw rod 51, stepping motor 52, baffle 53, nut 54, yaw assembly 6, positioning pin 61, first rod member 62, second rod member 63, yaw membrane 64, position-limiting block 7, fixing member 8, transmission shaft 9, shaft coupling 10, change-speed gearbox 11, and generator 12.

DETAILED DESCRIPTION OF THE EMBODIMENTS

The present invention is described in detail below in conjunction with specific embodiments. The following embodiments help those skilled in the art to further understand the present invention, but do not limit it in any way. It should be noted that a person of ordinary skill in the art can make a number of variations and improvements without departing from the conception of the present invention, which shall fall within the scope of protection of the present invention.

Figure 2:
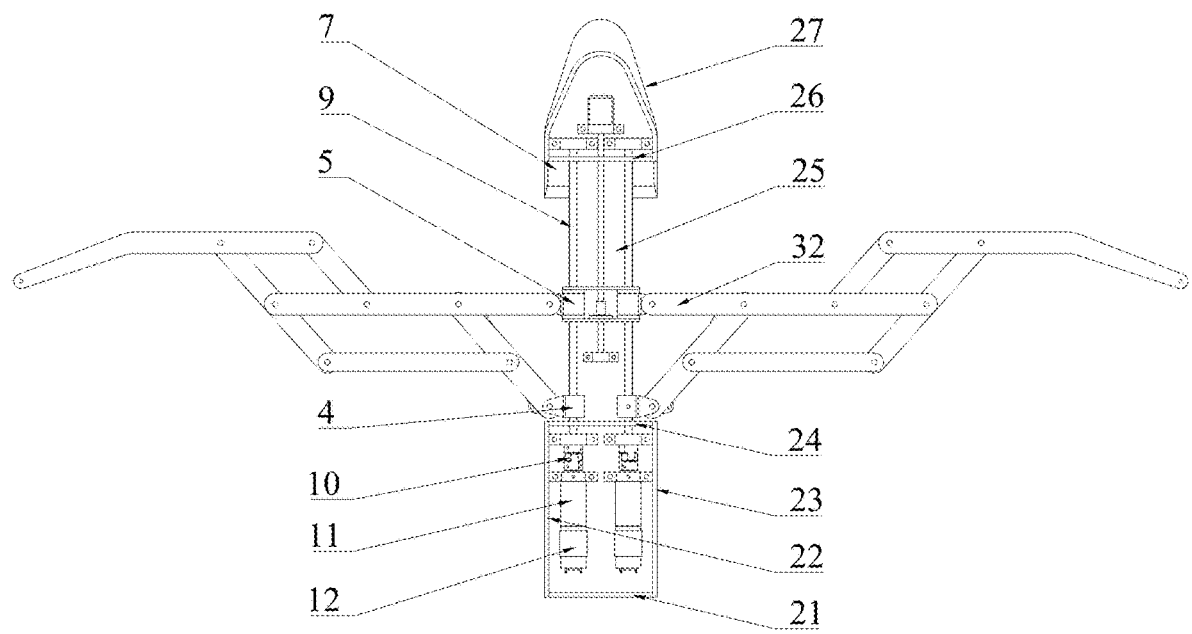
FIG. 2 is a top schematic view of a wave-energy-harvesting mechanism as a whole in the present invention.

As shown in FIG. 1 and FIG. 2, the present invention provides the folding wave-energy-harvesting mechanism for the underwater vehicle, including the underwater-vehicle main body 1 and the wave-energy-harvesting-device main body 2. The wave-energy-harvesting-device main body 2 is fixedly arranged on the underwater-vehicle main body 1 by the fixing member 8, and the fixing member 8 can be a hoop. The wave-energy-harvesting-device main body 2 includes the hydrofoil assembly 3 and the yaw assembly 6. The hydrofoil assembly 3 and the yaw assembly 6 both include a first state and a second state. The first state of the hydrofoil assembly 3 is a folding state, and the second state of the hydrofoil assembly 3 is an unfolding state. The first state of the yaw assembly 6 is the folding state, and the second state of the yaw assembly 6 is the unfolding state.

The wave-energy-harvesting-device main body 2 further includes a driving assembly and an energy-storage assembly. The driving assembly is configured to switch the hydrofoil assembly 3 in the first state and the second state to each other, and the driving assembly is configured to switch the yaw assembly 6 in the first state and the second state to each other. The energy-storage assembly is configured to store the wave energy harvested by the hydrofoil assembly 3.

When it is required to harvest the wave energy, the hydrofoil assembly 3 and the yaw assembly 6 are both switched to the second state by the driving assembly. The hydrofoil assembly 3 and the yaw assembly 6 transform wave energy of the waves into mechanical energy. The energy-storage assembly stores the energy harvested by the hydrofoil assembly 3 and the yaw assembly 6.

As shown in FIG. 2, the wave-energy-harvesting-device main body 2 includes: the first partitioning board 21, the second partitioning board 22, the third partitioning board 23, the fourth partitioning board 24, the bottom board 25, the fifth partitioning board 26, the counter-flow board 27, and the top cover board 28. The first partitioning board 21, the second partitioning board 22, the third partitioning board 23, the fourth partitioning board 24, the bottom board 25, and the top cover board 28 are coordinated to form a rear cabin for accommodating the energy-storage assembly. The rear cabin is an enclosed space providing waterproof protection for the energy-storage assembly. The bottom board 25, the fifth partitioning board 26, the counter-flow board 27 and the top cover board 28 are coordinated to form a front cabin for accommodating the driving assembly. The front cabin is an enclosed space providing waterproof protection for the driving assembly.

Figure 3:
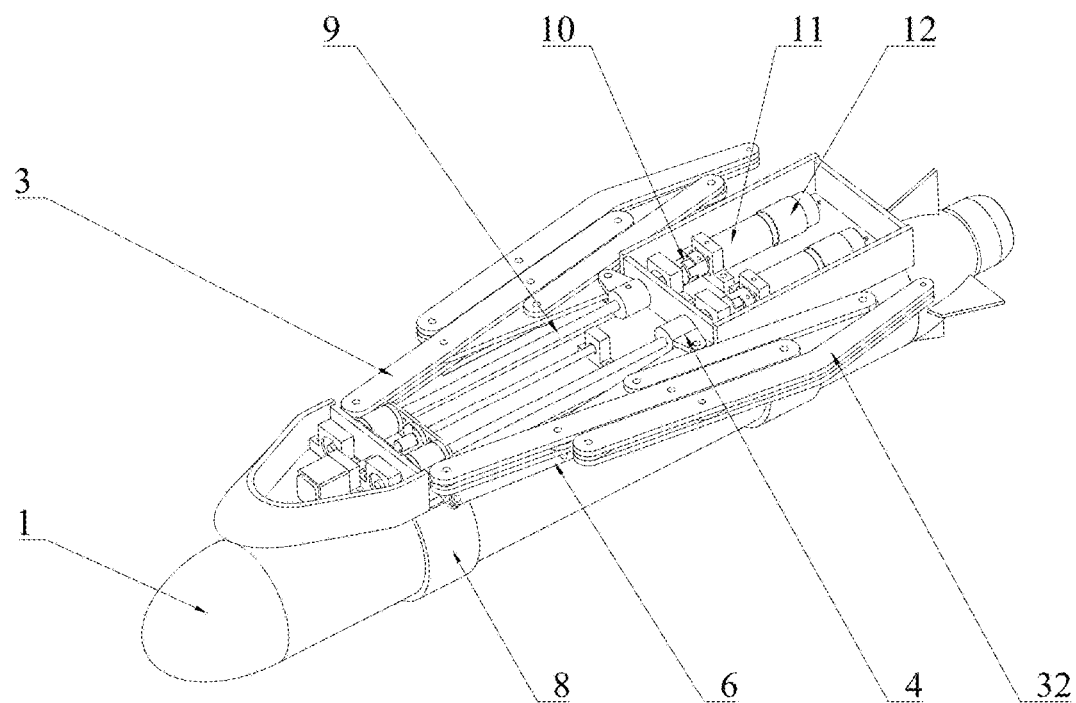
FIG. 3 is a schematic diagram of the overall structure of an energy-storage assembly in the present invention.

As shown in FIG. 2 and FIG. 3, the energy-storage assembly includes the transmission shaft 9, the change-speed gearbox 11, and the generator 12. One end of the transmission shaft 9 passes through the fourth partitioning board 24 and enters the rear cabin, and the transmission shaft 9 rotates relative to the fourth partitioning board 24. The change-speed gearbox 11 and the generator 12 are both fixedly installed in the rear cabin. One end of the transmission shaft 9 enters the rear cabin and then is drivingly connected to one end of the change-speed gearbox 11 by the shaft coupling 10, and the other end of the change-speed gearbox 11 is drivingly connected to the generator 12. (i.e. the transmission shaft 9 is connected to and drives the change -speed gearbox 11, and the change-speed gearbox 11 is connected to and drives the generator 12) When the transmission shaft 9 rotates, the transmission shaft 9 transmits the rotating motion to the change-speed gearbox 11 by the shaft coupling 10, and then drives the generator 12 to generate electricity, which supplies the energy for the underwater vehicle or stores the energy.

Figure 4:
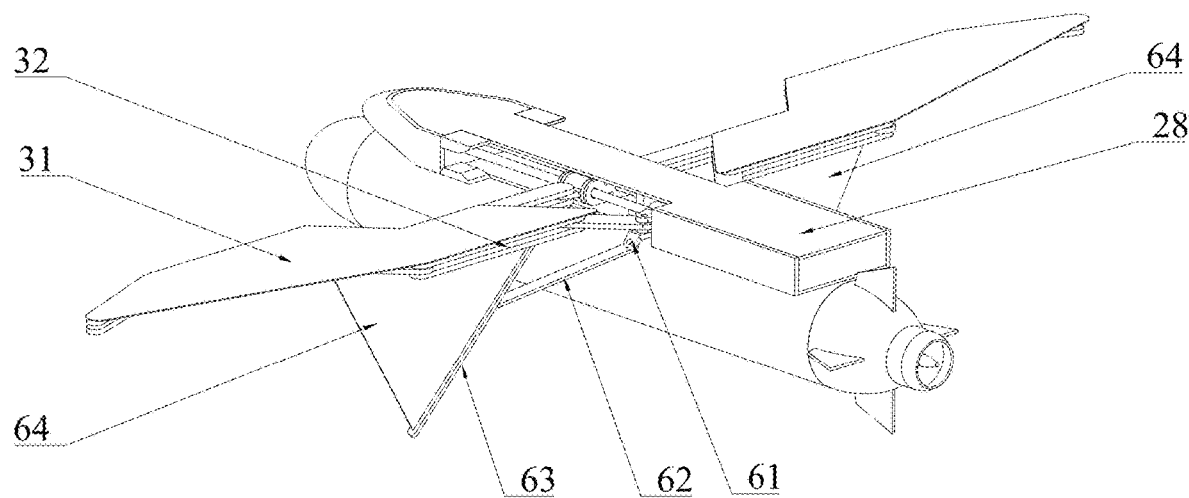
FIG. 4 is a schematic view of the side of the wave-energy-harvesting mechanism in the unfolded state.

As shown in FIG. 2, FIG. 3, and FIG. 4, the hydrofoil assembly 3 and the yaw assembly 6 are both arranged between the front cabin and the rear cabin of the wave-energy-harvesting-device main body 2. The transmission shaft 9 is fixedly provided with the rotating hinge 4. The rotating hinge 4 can reciprocate and rotate along with the transmission shaft 9, and transmits the torque. The transmission shaft 9 is rotatably and slidingly provided with the sliding hinge 5. The hydrofoil assembly 3 and the yaw assembly 6 are both installed on the transmission shaft 9 by the rotating hinge 4 and the sliding hinge 5. To keep the underwater vehicle balanced, a pair of the hydrofoil assemblies 3 and a pair of the yaw assemblies 6 are respectively and symmetrically installed on the both sides of the wave-energy-harvesting-device main body 2. Therefore, a pair of the energy-storage assemblies is in parallel spaced and installed on the wave-energy-harvesting-device main body 2. The pair of the energy-storage assemblies corresponds to the pair of the hydrofoil assemblies 3, and the pair of the energy-storage assemblies corresponds to the pair of the yaw assemblies 6.

Since the pair of the hydrofoil assemblies 3 has the same structure, the same motion mode, and the same connection with the energy-storage devices, one of the pair of the hydrofoil assemblies is taken as an example herein for description. The hydrofoil assembly 3 includes the hydrofoil membrane 31 and the plurality of the connecting rods 32. The plurality of the connecting rods 32 are hinged with each other to form two parallelogram-shaped folding structures. One side, adjacent to the wave-energy-harvesting-device main body 2, of the folding structure is provided with two ends of the connecting rods 32, and the two ends are hinged to the rotating hinge 4, and the sliding hinge 5, respectively. The first state of the hydrofoil assembly 3 is that the folding structure folds away, and the second state of the hydrofoil assembly 3 is that the folding structure unfolds. When the folding structure unfolds, the outline of the outermost connecting rod 32 is presented in a streamline form for reducing the resistance on the underwater vehicle.

The hydrofoil membrane 31 wraps on the folding structure, and the hydrofoil membrane 31 is a thin membrane made of a soft material. Preferably, the hydrofoil membrane 31 in this embodiment is a silica gel membrane. When the hydrofoil assembly 3 is in the first state, the hydrofoil membrane 31 is in a pressed state to reduce the resistance to the underwater motion of the whole device. When the hydrofoil assembly 3 is in the second state, the hydrofoil membrane 31 is in an unfolded state to increase the effective action area between the hydrofoil assembly 3 and waves, improving the efficiency of wave energy harvesting.

As shown in FIG. 2, FIG. 3, and FIG. 4, since the pair of the yaw assemblies 6 has the same structure, the same motion mode, and the same connection with the energy-storage devices and the hydrofoil assembly 3, one of the pair of the yaw assemblies 6 is taken as an example herein for description. The yaw assembly 6 includes the first rod member 62, the second rod member 63, and the yaw membrane 64. One end of the first rod member 62 is hinged to the center of the second rod member 63, and the other end of the first rod member 62 is hinged to the rotating hinge 4. The end, adjacent to the wave-energy-harvesting-device main body 2, of the second rod member 63 is hinged to the sliding hinge 5.

The yaw membrane 64 is installed between the second rod member 63 and the hydrofoil assembly 3, and the yaw membrane 64 is a soft membrane. Preferably, the yaw membrane 64 in this embodiment is a silica gel membrane. When the yaw assembly 6 is in the first state, the yaw membrane 64 is in a pressed state. When the yaw assembly 6 is in the second state, the yaw membrane 64 is in an unfolded state. When both the hydrofoil assembly 3 and the yaw assembly 6 are in the second state, the yaw membrane 64 and the hydrofoil membrane 31 are perpendicular to each other.

Figure 5:
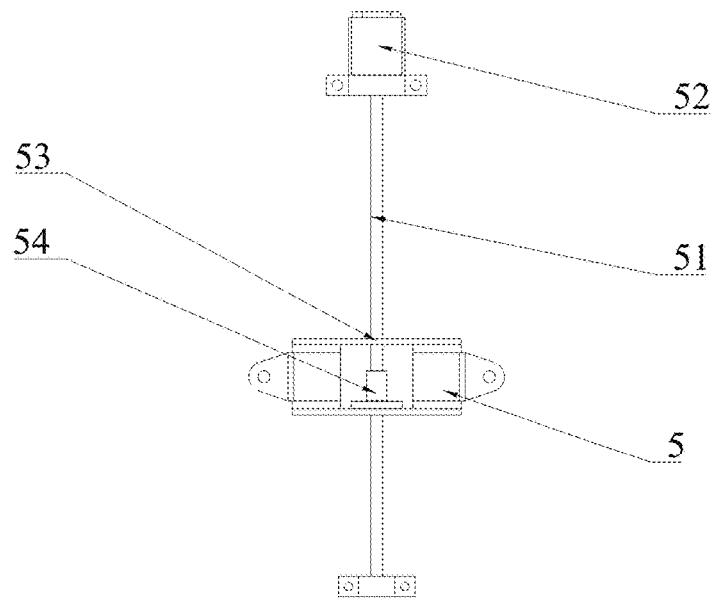
FIG. 5 is a schematic diagram of the overall structure of a driving assembly in the present invention.

As shown in FIG. 2 and FIG. 5, the driving assembly includes the screw rod 51, the stepping motor 52, the nut 54, and the baffles 53. The baffles 53 are fixedly connected to the two sliding hinges 5. The two baffles 53 are fixed installed on both sides of the two sliding hinges 5 respectively. The nut 54 is installed on the one of the baffles 53, and the nut 54 is located at the center of the two sliding hinges 5.

The stepping motor 52 is fixedly installed in the front cabin. The axial direction of the screw rod 51 is the same as the axial direction of the transmission shaft 9. One end of the screw rod 51 is drivingly connected to the stepping motor 52(i.e. one end of the screw rod 51 is connected to and drives the stepping motor 52) , and the other end of the screw rod 51 passes through the fifth partitioning board 26 and extends out the front cabin. The screw rod 51 rotates relative to the fifth partitioning board 26. The other end, extending out the front cabin, of the screw rod 51 is screwed to and passes through the nut 54. In operation, the stepping motor 52 drives the screw rod 51 to rotate, and drives the nut 54 to move straightly along the axial direction of the screw rod 51. Further, the baffle 53 transmits the applied force to the two sliding hinges 5, simultaneously driving the two sliding hinges 5 to move straightly along the axial direction of the transmission shaft 9.

Further, the first connecting member 62 is arranged on the yaw assembly 6 and the hydrofoil assembly 3 on the same side of the wave-energy-harvesting-device main body 2, and is hinged to the rotating hinge 4. The first connecting member 62 is connected to the side, nears the rotating hinge 4, of the connecting rod 32 by the positioning pin 61. The second connecting member 63 is arranged on the yaw assembly 6 and the hydrofoil assembly 3 on the same side of the wave-energy-harvesting-device main body 2, and is hinged to the rotating hinge 4. The second connecting member 63 is connected to the side, nears the rotating hinge 4, of the connecting rod 32 by the positioning pin 61. In this way the yaw assembly 6 and the hydrofoil assembly 3 are simultaneously switched between the first state and the second state.

Furthermore, the side, facing away from the counter-flow board 27, of the fifth partitioning board 26 is provided with the position-limiting block 7. The position-limiting block 7 guides the folding motion of the hydrofoil assembly 3 and the yaw assembly 6, and plays a role in fixing the hydrofoil assembly 3 and the yaw assembly 6 in the motion mode, avoiding affecting the motion of the underwater vehicle because of swaying of the folding structure.

Figure 6:
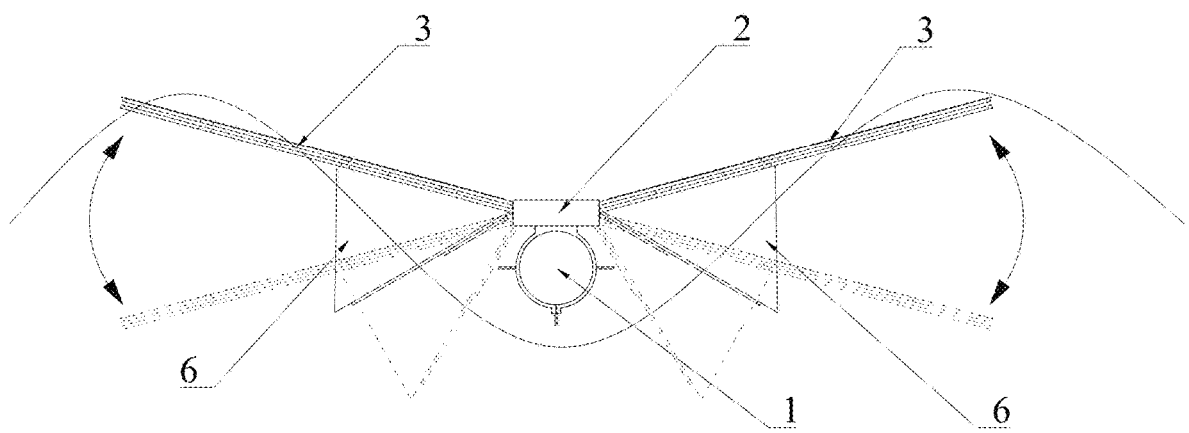
FIG. 6 is a schematic diagram showing reciprocating swing motions of the wave-energy -harvesting mechanism in the present invention.
Figure 7:
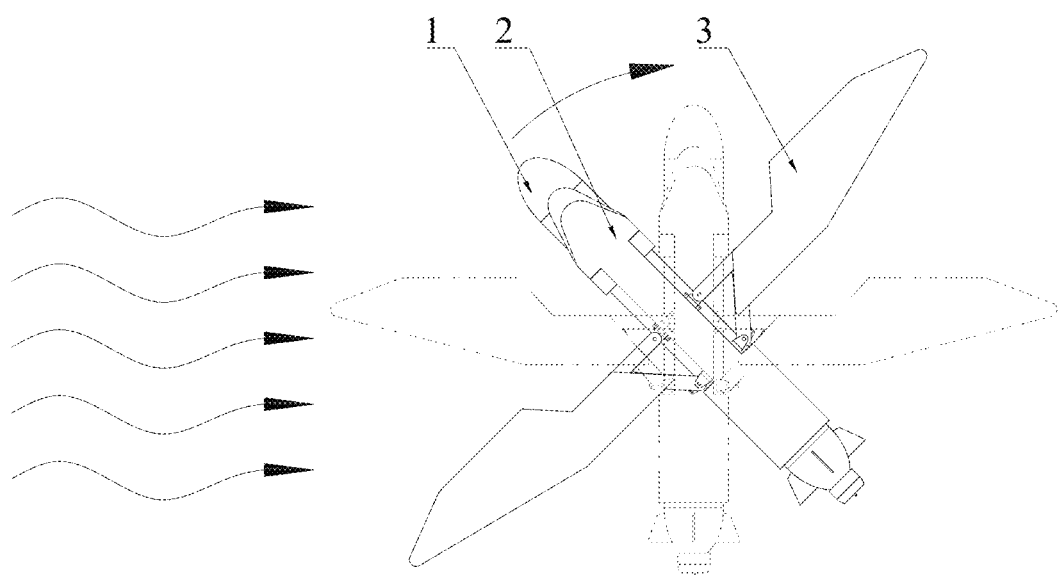
FIG. 7 is a schematic diagram showing the passive posture adjustment of the wave-energy-harvesting mechanism when countering waves according to the wave conditions in the present invention.

As shown in FIG. 2, FIG. 6, and FIG. 7, in the electricity generating mode, the stepping motor 52 drives the screw rod 51 to rotate, and then the baffle 53 simultaneously drives the two sliding hinges 5 to move straightly along the axial direction of the transmission shaft 9, such that the hydrofoil assembly 3 and the yaw assembly 6 can unfold simultaneously to further open up the hydrofoil membrane 31 and the yaw membrane 64 simultaneously. Under the excitation force of the waves, the hydrofoil assembly 3 swings reciprocally around the axial direction of the transmission shaft 9 that is connected to the hydrofoil assembly 3, and transmits the rotating motion to the transmission shaft 9 by the rotating hinge 4. Further, the transmission shaft 9 transmits the rotating motion to the change-speed gearbox 11 by the shaft coupling 10, and drives the generator 12 to generate electricity, which supplies the energy for the underwater vehicle or stores the energy.

On the other hand, the yaw assembly 6 in the unfolded state can passively adjust the posture of the underwater-vehicle main body 1 to counter waves according to the condition of the waves. When side surfaces of the main body does not counter the waves, the waves generate force applied on the yaw membrane 64, and provides restoring torque for the underwater-vehicle main body 1 such that the side surfaces of the underwater-vehicle main body 1 are enabled to counter the waves, thereby improving the efficiency of wave energy harvesting.

In the motion mode, the stepping motor 52 drives the screw rod 51 to rotate, so as to simultaneously unfold the hydrofoil assembly 3 and the yaw assembly 6 and reduce the resistance to the underwater motion of the whole device. In the folding process, the position-limiting block 7 is configured to guide the motion of the hydrofoil assembly 3 and the yaw assembly 6. When the folding process is completed, the position-limiting block 7 plays a role in fixing the hydrofoil assembly 3 and the yaw assembly 6, preventing the hydrofoil assembly 3 and the yaw assembly 6 from swaying in the motion process, further avoiding affecting the motion of the underwater vehicle.

Working Principle

In the electricity generating mode, the stepping motor 52 drives the screw rod 51 to rotate, and then the baffle 53 simultaneously drives the two sliding hinges 5 to move straightly along the axial direction of the transmission shaft 9, simultaneously unfolding the hydrofoil assembly 3 and the yaw assembly 6, so that the hydrofoil membrane 31 and the yaw membrane 64 can be opened up simultaneously. Under the excitation force of the waves, the hydrofoil assembly 3 swings reciprocally around the axial direction of the transmission shaft 9 that is connected to the hydrofoil assembly 3, and transmits the rotating motion to the transmission shaft 9 by the rotating hinge 4. Further, the transmission shaft 9 transmits the rotating motion to the change-speed gearbox 11 by the shaft coupling 10, and drives the generator 12 to generate electricity, which supplies the energy for the underwater vehicle or stores the energy. In the motion mode, the stepping motor 52 drives the screw rod 51 to rotate, simultaneously unfolding the hydrofoil assembly 3 and the yaw assembly 6 and thus reducing the resistance to the underwater motion of the whole device. In the folding process, the position-limiting block 7 guides the motion of the hydrofoil assembly 3 and the yaw assembly 6. When the folding process is completed, the position-limiting block 7 plays a role in fixing the hydrofoil assembly 3 and the yaw assembly 6, such that the hydrofoil assembly 3 and the yaw assembly 6 is prevented from swaying in the motion process, thereby avoiding affecting the motion of the underwater vehicle.

In the description of this disclosure, it should be understood that the terms "upper", "lower", "front", "rear", "left", "right", "vertical", "horizontal", "top", "bottom", "inside", "outside", and other words indicate an orientation or positional relationship based on the orientation or the positional relationship shown in the accompanying drawings and these terms are intended only to facilitate and simplify the description of this disclosure, not to indicate or imply that the device or element referred to must have the specific orientation, or construction and operation in the specific orientation, and therefore cannot be construed as a limitation to the present invention.

The specific embodiments of the present invention have been described above. It should be understood that the present invention is not limited to the specific embodiments described above. A person skilled in the art may make various changes or modifications within the scope of the claims, which do not affect the substantial contents of the present invention. The embodiments and features in the specific embodiments of the present application may be combined with each other optionally, provided that there is no conflict.

What is claimed is:

1. A folding wave-energy-harvesting mechanism for an underwater vehicle, comprising:
a wave-energy-harvesting-device main body, wherein the wave-energy-harvesting-device main body is arranged on an underwater-vehicle main body of the underwater vehicle,
wherein the wave-energy-harvesting-device main body comprises a hydrofoil assembly and a yaw assembly, each of the hydrofoil assembly and the yaw assembly comprising a first state and a second state;
the first state of the hydrofoil assembly and the first state of the yaw assembly are each a folded state, and the second state of the hydrofoil assembly and the second state of the yaw assembly are each an unfolded state;
the wave-energy-harvesting-device main body further comprises a driving assembly and an energy-storage assembly;
the driving assembly is configured to move the hydrofoil assembly to switch between the first state and the second state of the hydrofoil assembly, and the driving assembly is configured to move the yaw assembly to switch between the first state and the second state of the yaw assembly; and
the energy-storage assembly is configured to store wave energy harvested by reciprocal rotation of the hydrofoil assembly around a transmission shaft of the wave-energy-harvesting-device main body, the reciprocal rotation being generated in response to excitation forces of waves.

2. The folding wave-energy-harvesting mechanism for the underwater vehicle according to claim 1, wherein the hydrofoil assembly comprises a hydrofoil membrane and a plurality of connecting rods;
- the plurality of the connecting rods are hinged with each other to form at least one parallelogram-shaped folding structure;
- the first state of the hydrofoil assembly comprises a state in which the at least one parallelogram-shaped folding structure is folded, and the second state of the hydrofoil assembly comprises a state in which the at least one parallelogram-shaped folding structure is unfolded;
- the hydrofoil membrane wraps on the at least one parallelogram-shaped folding structure, and the hydrofoil membrane is a foldable material;
- when the hydrofoil assembly is in the first state, the hydrofoil membrane is folded; and
- when the hydrofoil assembly is in the second state, the hydrofoil membrane is unfolded.

3. The folding wave-energy-harvesting mechanism for the underwater vehicle according to claim 2,
- wherein the yaw assembly comprises a first rod member, a second rod member, and a yaw membrane;
- a first end of the first rod member is hinged to a middle of the second rod member; each of the first rod member and the second rod member is hinged to the driving assembly;
- the yaw membrane is arranged between the second rod member and the hydrofoil assembly, and the yaw membrane is a foldable membrane;
- when the yaw assembly is in the first state, the yaw membrane is in a folded state; and
- when the yaw assembly is in the second state, the yaw membrane is unfolded.

4. The folding wave-energy-harvesting mechanism for the underwater vehicle according to claim 3, wherein when each of the hydrofoil assembly and the yaw assembly is in the second state, the yaw membrane is perpendicular to the hydrofoil membrane.

5. The folding wave-energy-harvesting mechanism for the underwater vehicle according to claim 3, wherein a second end of the first rod member and one end of the second rod member are adjacent to the driving assembly, and the second end of the first rod member and the one end of the second rod member are connected to the hydrofoil assembly by a positioning pin.

6. The folding wave-energy-harvesting mechanism for the underwater vehicle according to claim 5,
- wherein the energy-storage assembly comprises a transmission shaft, a change-speed gearbox, and a generator;
- the transmission shaft drives and is connected to a first end of the change-speed gearbox, and a second end of the change-speed gearbox drives and is connected to the generator;
- the transmission shaft is fixedly provided with a rotating hinge;
- a sliding hinge is rotatably and slidably arranged on the transmission shaft;
- the first rod member and a first connecting rod are hinged to the rotating hinge, wherein the first connecting rod is connected to the first rod member; and
- the second rod member and a second connecting rod are hinged to the sliding hinge, wherein the second connecting rod is connected to the second rod member.

7. The folding wave-energy-harvesting mechanism for the underwater vehicle according to claim 6,
- wherein the driving assembly comprises a screw rod, a stepping motor, a nut, and a baffle;
- the baffle is fixedly connected to the sliding hinge, and the baffle is fixedly connected to the nut;
- the screw rod is screwed to the nut, and the screw rod passes through the nut; and
- the stepping motor drives the screw rod to rotate.

8. The folding wave-energy-harvesting mechanism for the underwater vehicle according to claim 1,
- wherein the wave-energy-harvesting-device main body comprises:
  - a first partitioning board, a second partitioning board, a third partitioning board, a fourth partitioning board, a bottom board, a fifth partitioning board, a counter-flow board, and a top cover board;
- the first partitioning board, the second partitioning board, the third partitioning board, the fourth partitioning board, the bottom board, and the top cover board are coordinated to form a rear cabin; and
- the rear cabin is configured for accommodating the energy-storage assembly.

9. The folding wave-energy-harvesting mechanism for the underwater vehicle according to claim 8,
- wherein the bottom board, the fifth partitioning board, the counter-flow board, and the top cover board are coordinated to form a front cabin, and
- the front cabin is configured for accommodating an active assembly.

10. The folding wave-energy-harvesting mechanism for the underwater vehicle according to claim 8, wherein a side, facing away from the counter-flow board, of the fifth partitioning board is provided with a position-limiting block.

* * * * *